United States Patent [19]

Spiegel

[11] Patent Number: 5,349,980
[45] Date of Patent: Sep. 27, 1994

[54] SERVICE MODULE FOR AN AUTOMOBILE SERVICING VEHICLE

[76] Inventor: Daniel J. Spiegel, 2327 Kenmore Dr., Charlotte, N.C. 28204

[21] Appl. No.: 93,813

[22] Filed: Jul. 19, 1993

[51] Int. Cl.⁵ .............................................. B65H 75/34
[52] U.S. Cl. ..................................... 137/1; 137/234.6; 137/355.26
[58] Field of Search ...................... 137/899.4, 574, 559, 137/355.26, 355.23, 355.17, 234.6, 1

[56] References Cited

U.S. PATENT DOCUMENTS

| | | | |
|---|---|---|---|
| 1,989,940 | 2/1935 | McGaughan et al. | 137/234.6 |
| 2,102,795 | 12/1937 | Gray | 137/234.6 |
| 2,221,566 | 11/1940 | Barks et al. | 137/355.17 |
| 2,498,229 | 2/1950 | Adler | 137/234.6 |
| 4,628,960 | 12/1986 | Brickell et al. | 137/559 |

*Primary Examiner*—A. Michael Chambers

[57] ABSTRACT

A service vehicle with a service module mounted in the bed of the service vehicle is used to change the engine oil of a customer vehicle and generally service the vehicle. The module includes a waste oil tank forming the base of the module and a plurality of fresh fluid tanks mounted above the base tank. The base tank is low and long in dimension and configured generally flat relative the fresh fluid tanks to spread the weight of the module over the bed of the service vehicle. The tanks of the module are configured such that equal portions of the cumulative volume of the tanks are positioned on either side of the longitudinal axis of the service vehicle such that the base tank distributes the weight of the fluids and the module equally on either side of the service vehicle. One tank is removably mounted to the other tanks. Extensible hoses are associated with each fresh fluid tank to pump the fluids to a customer vehicle and sight gauges on the tanks provide quick indication of the level of fluids therein. The module is dimensioned and configured to provide an efficient use of the space in the service vehicle, such as a standard van, and the applicable components of the module are generally accessible from the rear of the vehicle making the service of a customer vehicle more efficient.

36 Claims, 2 Drawing Sheets

SERVICE MODULE FOR AN AUTOMOBILE SERVICING VEHICLE

FIELD OF THE INVENTION

This invention relates to service vehicles and more particularly to a module to be installed in a service vehicle which is utilized to replace the motor oil in a customer vehicle and to generally service the customer vehicle.

BACKGROUND OF THE INVENTION

Cars, trucks, and motorized vehicles with various types of engines, such as internal combustion engines, utilize engine oil in order to lubricate their internal engine parts, such as the engine pistons and the cam shaft, to name a few. When the vehicle is operated and the engine runs, the oil is continuously circulated or pumped throughout the engine to provide lubrication to the internal parts. As the engine oil is circulated, it accumulates dirt and other contaminants which make it into the internal chambers of the engine and becomes dirty. Additionally, engine oil lubricates mechanical engine parts which often operate at substantially high temperatures. These high temperatures and the constant circulation of the oil over the hot moving engine parts, breaks the oil down and lowers it viscosity. Dirty, less viscous oil does not lubricate as well as clean, viscous oil and after a certain amount of time, the dirty, used engine oil must be replaced. An oil change in an automobile is often recommended every three thousand (3,000) miles in order to ensure proper engine performance and reduce engine wear.

Replacing engine oil has traditionally been done in one of two ways. Either the owner of the vehicle changed the oil himself or he delivered the vehicle to a garage or other service establishment to change the oil for him. Recently, an alternative service has been developed wherein a company sends a service truck or van to the location of a customer's vehicle and the operator of the van changes the oil at the location of the customer's car. Since the oil changing vehicle is mobile, a customer may have his oil changed at his home, at his place of business or any other place that he might desire. Mobile oil changing services eliminate the necessity of leaving a vehicle at a garage for a long period of time and allow the customer to avoid the often-encountered long lines at traditional drive-up oil service bays. Additionally, with a mobile oil changing service, the customer does not have to wait with the vehicle during the service, therefore allowing the customer more efficient use of his time.

Early mobile oil change vehicles were vans or trucks which essentially just delivered the operator and the necessary material, such as cans of fresh oil, to the service site. The waste oil was simply dumped into a bucket or other storage container while the individual cans of motor oil were opened and emptied into the customer's car much the same way that a person changing their own oil would operate. As may be appreciated, this was a very messy endeavor as waste oil, as well as fresh oil from the open cans, would find its way onto various surfaces inside the service van onto the hands of the operator, and often onto surfaces of the customer's car. Moreover, the large number of individual oil cans and other supplies necessary to service an adequate number of vehicles took up an moderate amount of space in the vehicle leaving little room for anything else.

Furthermore, mobile service vehicles were inefficient because the operator would often be fumbling around in the back of the crowded van in order to find the needed materials and equipment. An inefficient operator and service vehicle is undesirable because it reduces the number of customer cars that may be serviced in a day's period and therefore reduces the daily profits per service vehicle.

Drive-up oil changing services and garages also offer additional services. For example, they will replace other car fluids, such as windshield washer fluid, will offer several different kinds and/or grades of motor oil, and will replace wiper blades and air filters. Mobile oil changing services, in order to be competitive with drive-up oil changing services, also have to offer such additional services to their customers. Since all of the material and equipment for the additional services has to be immediately accessible to the operator depending upon the desires of the customer, it has become necessary for the service vehicles to carry additional oil, fluids, and equipment such as wiper blades, oil filters and air filters. As might be expected, this presents additional space constraints and clutter in an already crowded service van and additional mess for the operator to control. In turn, the efficiency of the mobile oil service is further degraded.

Another important consideration for a mobile oil service is the storage and disposal of the waste oil and the fresh oil respectively. Waste oil has a tendency to spill and to slosh around when the vehicle is moving. Further, waste oil, as well as fresh oil, is heavy, and therefore, emptying fresh oil away from one area of the vehicle while simultaneously pouring the waste oil into a container in another area of the service van, shifts the weight load of the service vehicle and degrades the operation of the vehicle. When too much oil weight is located at one side or the other of the center axis of the service vehicle, the vehicle has a tendency to tip when driven around a corner and possibly roll over if the curve is sharp enough and the weight discrepancy is substantial. For example, a gallon of oil weighs approximately 7 pounds and therefore 50 gallons of oil from servicing approximately only 50 cars weighs around 350 pounds. Safety and driving considerations therefore limited the amount of oil that could be carried by the traditional service vehicles. As a result, the number of customer cars that might be serviced in a days time by the service vehicle was reduced which reduced the efficiency and profitability of the service van. Further, with the reduced oil capacity, it is necessary to continually empty the waste oil and replenish the supply of fresh oil on a rather frequent basis to maintain continual operation of the service vehicle and prevent spillage of the waste oil from its container.

Past oil changing service vehicles have attempted to reduce the oil mess and increase the overall efficiency of the service vehicle. For example, instead of having individual oil cans and emptying waste oil into a separate unattached and uncovered container, the fresh oil was stored and taken from one tank, while the waste oil was pumped into a second tank. Additionally, these vehicles utilized hoses on reels to deliver the fresh oil and fluids to the customer vehicle and remove waste oil from that vehicle. Still further, early service vehicles had other vehicle fluids besides oil stored in tanks, such as windshield wider washer fluid, which were pumped through a hose to the customer's car. However, the early vehicles were not particularly efficient to operate, did not make efficient use of the internal vehicle space and did not adequately address the concerns of shifting fluid weight and distribution due to the changing levels of fresh oil, waste oil and other fluids. Moreover, the placement of the various tanks and necessary materials created a crowded service vehicle making it difficult for the operator to gain access to the materials and fluid needed.

SUMMARY OF THE INVENTION

The present invention provides a service module which is mounted inside a service vehicle such as a van or truck. The module includes a waste oil tank and a series of fresh fluid tanks placed atop the waste oil tank. The tanks of the module are configured and positioned so that when a module is mounted in a service van, the cumulative volume of the tanks is distributed equally on both sides of the center longitudinal axis of the van bed. With equal tank volume on either side of the center van axis, the weight of the fluids in the tanks is distributed equally on either side of the bed to preserve the stability of the service van. The tanks are further positioned in the module such that as the fresh fluids are drained and waste oil added to the module, the fluid weight remains equally distributed on both sides of the van's center axis.

The waste oil tank has a generally rectangular cross-section and is positioned in the bed of the vehicle to receive the waste oil which is drained from the customer car or other vehicle being serviced. The waste oil tank has a relatively short height and a relatively long length and is configured to lie flat on the bottom of the van bed to suggest the weight of the module and spread the module weight over the van bed. A funnel is connected at the rearward end of the waste oil tank to receive the waste oil drained from the engine of a customer vehicle and direct the oil into the waste oil tank. A drain valve is also located at the rear of the waste oil tank to drain the tank when it becomes filled. When the module is positioned within the bed of the service van, both the funnel and the drain valve are easily accessible to the operator from the rear of the vehicle. The waste oil tank contains the used oil so that it does not slosh around and cause a mess when the service van is in motion.

Mounted on top of the waste oil tank are a series of fresh liquid tanks which are coextensive with each other from one side of the module to the other to contain the fresh fluids used during service of the customers vehicle. In a preferred embodiment, a large tank is divided by partitions into several fresh fluid tanks. At least one of the fresh fluid tanks, and preferably two, are fresh oil tanks which contain fresh engine oil to be transferred to the customer vehicle to replace the used oil drained from the engine. The fresh fluid tanks are generally taller than the waste oil tank and shorter than the waste oil tank so that several coextensive tanks are positioned above the one waste oil tank. The remaining fresh fluid tanks contain other fluids such as windshield washer fluid, water to be used with a pressure washer which may be utilized to clean oil spills or any other mess which results from the servicing, and specialty oil to be used at a customer's request instead of the standard service oil carried in the fresh oil tanks. Preferably, at least one of the fresh fluid tanks is removably attached to the other fresh fluid tanks so that it may be conveniently removed and replaced and moved from vehicle to vehicle. For example, the specialty oil might be in a detachable tank so that depending upon a particular customer's service needs, different specialty oils may be readily moved in and out of different service vans.

The fresh fluid tanks and waste oil tanks contain internal baffles which act to prevent the fluids and oils from shifting around substantially during motion of the service vehicle. Further, the waste oil tank has a fluid capacity greater than the combined capacity of the two fresh oil tanks, so that a maximum number of vehicles may be serviced and the fresh oil tanks drained before it becomes necessary to empty the waste oil tank. The tanks also include sight gauges thereon so the operator may determine the level of fluid in the tanks.

A plurality of hose reels with extensible hoses are mounted proximate the rearward end of the vehicle, approximately equidistant from the rear of the module for easy access from the rear of the van to supply fresh fluids and compressed air to the customer vehicle. The hoses are connected to the fresh fluid and air tanks. Various pumps to pump the fresh fluids and oils are mounted on the rear wall of the rearward most fresh fluid tank, to allow easy access for repair or replacement. The water tank is connected to a pressure washer and a hose to supply pressurized water for cleaning and other purposes.

The entire module including waste oil tanks, fresh fluid tanks, reels, compressor and air tanks, is dimensioned so that when mounted in the rearward end of a standard van, generally over the rear axle, it distributes the liquid weight evenly, makes efficient use of the space, and leaves sufficient space in the van forward of the module to store other necessary service equipment and supplies. When mounted in a van, the tank hoses are easily accessed from the rear doors while the space forward of the module, which contains additional supplies, is accessible from the side doors. Further, refill openings for all of the tanks are located to be easily accessed from either the rear or side door of the service van.

The present invention provides a service vehicle module with all of the necessary equipment and supplies for the complete mobile service of a customer vehicle with minimal mess and high efficiency. The module maintains a substantially equal weight distribution of the fluids in the service van and makes efficient use of the space in the van. The necessary hoses and other supplies are all readily accessible from the rear or side doors of the van. The end result is a safer more stable service van and an overall increase in the productivity of the service van therefore increasing the number of customer vehicles which may be serviced in a day's time and increasing the monetary profit per service van.

These and other features of the present invention will be more readily understood in view of the following detailed description and the drawings.

DETAILED DESCRIPTION OF THE DRAWINGS

Figure 1:
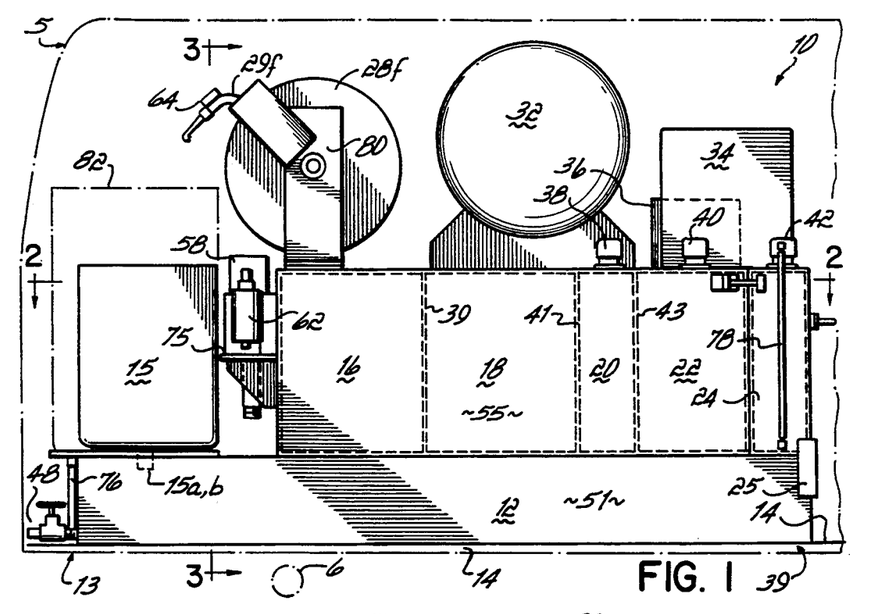
FIG. 1 is a side elevational view of the service module of the present invention.

Referring to FIG. 1, a side view of the service module 10 of the present invention mounted in the bed 14 of a service vehicle 5 shows a waste oil tank 12 located generally at the bottom of the module 10 and extending along substantially the entire length of the module. The waste oil tank 12 is short in height and relatively long and is used as a base for the module 10 to spread the weight of the module over the bed of the service vehicle which may be a pick-up truck, or preferably, a van. The module 10 is mounted at the rear of the van bed 14 to extend partially over the rear axle 6 (axle 6 is moved up close to bed 14 in FIG. 1 for illustrative purposes), and the tank 12 is dimensioned to substantially cover the rear section of van bed 14. Waste oil tank 12 contains waste oil (not shown) which has been drained from a customer vehicle engine that is serviced by the service van 5. Mounted on top of waste oil tank 12 and at the rearward end 13 of tank 12 is a waste oil funnel 15. Openings 15a and 15b in the bottom of funnel 15 are aligned with similar openings in tank 12 so that waste oil poured into the funnel 15 drains, by gravity, into the waste oil tank 12. (See FIG. 2). A service vehicle operator simply drains the used oil from the customer vehicle into a pan or other container (not shown) and pours the waste oil into funnel 15. In this way, there is no need to utilize a pumping system or other fluid transfer system in order to deliver the used oil from one container to waste oil tank 12. Funnel 15 is located at the rear of the module 10, and the rear of the van 5 for ready access to the service operator. Funnel 15 is located to one side of module 10 and additional equipment, a shelf 82 and/or a waste basket (not shown) might be mounted on the other side of module 10.

Mounted on top of waste oil tank 12 is a plurality of fresh fluid tanks 16, 18, 20, 22, and 24 (16–24). The fresh fluid tanks 16–24 contain the various fluids which are utilized to fully service a customer vehicle once the used oil is drained. The tanks 16–24 are generally coextensive with each other in width from one side of the module 10 to the other side and are dimensioned to be taller and shorter than the waste oil tank 12 so that several tanks may be placed in a block above tank 12. The combination of the short, long length waste oil tank 12 and the plurality of tall, short length fresh fluid tanks 16–24 spreads the weight of the oils and fluids away from the rear axle so that the rear axle of the service vehicle is not overstressed.

Removing fresh fluids and oils from a service van and subsequently filling a container inside the van with used oil shifts the distribution of weight inside the van. With past service vehicles, this would cause the weight distribution to shift from one side of the vehicle to the other as the various fresh fluids were removed and the waste oil fluid level was raised, and consequently, the shifting weight distribution made the van unstable. This was particularly noticeable when the vehicle was driven around a turn or corner because a van full of fresh oil, waste oil or both would have a tendency to tip or even roll completely over. As a result, the prior service vehicles did not carry a full amount of supplies, and the prior service vehicles were often not filled to full capacity with waste oil or fresh oil in order to ensure the road worthiness of the vehicle. Further, any containers of fluid often had to be moved around to try and achieve a stable load as the fresh oil and waste oil levels changed. As may be appreciated, this dramatically reduced the efficiency of the service van.

Figure 2:
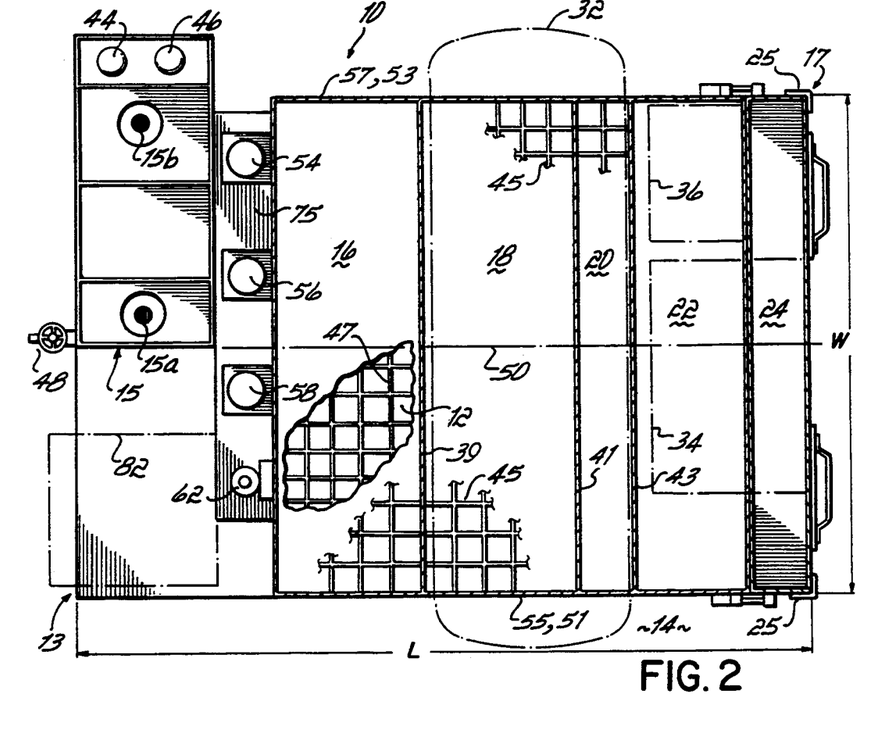
FIG. 2 is a top diagrammatic view, partially cutaway along lines 2—2 of FIG. 1.

In the module 10 of the present invention, the waste oil tank 12 and the fresh fluid tanks 16–24 distribute the cumulative volume of the tanks equally on both sides of the center longitudinal axis 50 of the bed 14 of the service van. Referring to FIG. 2, longitudinal center axis line 50 illustrates the generally equal tank volumes that overlie either side of bed 14 portions. The waste oil tank 12 and the fresh fluid tanks 16–24 of module 10 distribute the volume of the tanks equally to either side of longitudinal axis line 50 so that the cumulative weight of the fluids contained in the tanks is also distributed equally on either side of the longitudinal axis line 50. Further, the tanks are each positioned so that the volume of any individual tank is distributed equally on either side of axis line 50. In this way the weight of the fluid remains equally distributed despite the level of fluid in any one of the tanks. As seen in FIG. 2, the fresh fluid tanks 16, 18, 20, 22 and 24 are coextensive widthwise with each other from one side 51 of waste oil tank 12 to the other side 53 of tank 12. The side walls 55, 57 of the block of fresh fluid tanks 16–24 substantially align with the left and right side walls 51, 53 of the waste oil tank 12. By mounting the module 10 of the present invention in the center of van bed 14 to the rear of the van 5 distribute the weight of the fluids generally equally on both sides of the bed 14, the load substantial fluid of the module 10 does not shift unequally to either side of the van 5 as the fluid is drained from the fresh fluid tanks 16–24 and the waste oil tank 12 is subsequently filled with waste oil. The fluid weight is equally spaced over the van 14 at all times and, therefore, suspension on one side of the van 5 is not stressed anymore than the suspension on the other side of the vehicle and the van 5 will not have a tendency to tip or roll over in motion regardless of the levels of fluids in the waste oil tank 12 and fresh fluid tanks 16–24. For example, the waste oil tank may be filled completely and the fresh fluid tanks 16–24 drained completely without varying the side-to-side distribution of the weight of van 5. This creates a safer and smoother riding vehicle and allows the tanks of module 10 to be used at full capacity without concern for a skewed load in the vehicle. This, in turn, increases the number of customer vehicles which may be serviced by a van between supply replenishment stops, and therefore, increases the efficiency and profitability of the van.

Referring to FIG. 2, one preferred embodiment of the module 10 of the present invention utilizes a waste oil tank 12 having a length dimension L of approximately 71 inches, a width dimension W of 51 inches and a height dimension H of 8.75 inches. (See FIG. 3). The dimensions of the waste oil tank 12 give it a short, long and somewhat flat shape which spreads the weight of the waste oil and the module evenly over the van bed 14 and partially away from axle 6. To this end, the width dimension W of the waste oil tank is preferably between approximately 65% to 75% of the length dimension L of tank 12 and the height dimension H is preferably between approximately 8% to 15% of the length dimension of tank 12. Of course, depending upon the space constraints in van 5, these dimensions may be changed. On the other hand, the fresh fluid tank 16–24 are taller and shorter than the waste oil tank 12 to allow the fresh fluid tanks to all be placed widthwise coextensively with each other on top of waste oil tank 12.

In a preferred embodiment of the module 10 of the present invention tanks 16 and 18 contain the fresh oil to replace the waste oil drained from the customer vehicle engine. Tanks 16 and 18 may be filled with the same type of oil, or the two tanks may have different brands or different weights of oil. Two fresh oil tanks increase the number of vehicles which may be serviced without replenishing the supply of fresh oil in the service vehicle. Herein, "fluid" will be used to refer to both oil and non-oil fluids such as water or air. Tank 20, contains water for supplying a pressure washer, as described hereinbelow, which may be used to clean up any oil spills or any other mess made during the servicing of a vehicle, including smears or smudges on the finish of the customer vehicle. Tank 22 contains a supply of windshield washer fluid for replenishing the washer fluid in the customer vehicle. Tank 24 is a removably attached tank which is mounted onto tank 22 by a bracket and associated connecting mechanism 25 so that tank 24 may be easily removed and remounted to the plurality of fresh fluid tanks 16–22. Tank 24 preferably contains a specialty oil which may be used for a particular customer when they desire an oil different than the standard service oil contained in tanks 16, 18. For example, the specialty oil of tank 24 may be a different weight oil than the oil in tanks 16, 18, or it may be a completely different type or brand of oil altogether, such as a synthetic oil. While a preferable tank arrangement is shown, the exact order of the fluids in the fresh fluid tanks 16–24 may be altered without departing from the scope of the present invention. Additionally, other fluids needed for the service might be contained in the tanks other than those fluids specifically described herein. Still further additional fresh fluid tanks might be added to module 10.

Mounted between funnel 15 and the plurality of tanks 16–24 are a series of pumps 54, 56, 58 and 62 which are used to pump various oils and fluids from the fresh oil tanks 16, 18 and 24 and fluid tank 20. On top of the rearward most fresh oil tank 16 are mounted a plurality of rotatable reels 28a–f (FIG. 3), each containing an associated extensible hose 29a–f which is connected to a fresh fluid tank 16–24 or to a compressed air tank 32. The mounting of the reels 28a–f and hoses 29a–f proximate the rearward end of the module 10 and the rearward end 13 of the vehicle, allows a service operator easy access to the hoses 29a–f which deliver all of the fluids contained in module 10. The service operator merely grabs a particular hose, such as hose 28a, and extends the hose to the customer vehicle in order to deliver a fluid to the vehicle. Further, the oil hoses, such as hoses 29a, 29b, are mounted so that the hose ends hang above the funnel 15 to allow any oil drippage from the hoses to be collected by funnel 15. (See FIG. 3).

Reel guides, such as guide 80, are used with each reel and the reels are spring biased to retract the hoses to their wound positions. Also mounted on top of the fresh fluid tanks and forwardly of the reels 28 is a compressed air storage tank 32. The compressed air from tank 32 supplies air to a service hose 29f, on reel 28f and also supplies compressed air to run the pumps 54, 56 and 58 which pump fresh oil from tanks 16, 18 and 24 respectively. Mounted on top of fresh fluid tanks 22 and 24, forwardly of the compressed air storage tank 32, is an air compressor 34 to supply the compressed air and a control power unit 36 which is coupled to the service vehicle engine to generate the electricity needed by the compressor 34 from the operation of the service vehicle engine. Control power unit 36 provides electrical power in a form, such as AC power, which may be utilized by the air compressor 34. A pressure washer unit 37 (not shown mounted to module 10) is connected between the water tank 20 and hose 28c to propel pressurized water from hose 28c when necessary. The commercially available pressure washer 37 has an associated power supply to power the washer.

Each of the fresh fluid tanks 16–24 has an accessible opening for refilling the tank. For example, fresh fluid tanks 20, 22, 24 have openings 38, 40, 42, respectively, with removable caps, through which fluid is poured or pumped to refill the tanks. The main fresh oil tanks 16 and 18 have openings 44, 46 which are located proximate the rearward end 13 of the module 10 to one side of the funnel 15 as shown in FIG. 2. Openings 44 and 46 are located at the rearward end 13 of the module 10 so as to be accessible from the rear of the service vehicle to refill the oil tanks. As may be seen in FIG. 2, the openings 44, 46 also overlie a portion of funnel 15 so that any overflow from the openings during filling of tanks 16, 18 is captured by funnel 15. When the module is mounted inside a van, the openings 38, 40, and 42 are accessible from the side door of the van, at the forward end 39 of the module 10. However, similar connections to fresh oil tanks 16 and 18 would require substantial reaching into the van from the side door in order to fill the tanks. Therefore, the openings 44 and 46 are placed so as to be easily accessed at the rear of the service vehicle, and associated fluid pipes or conduits (not shown) attach the openings 44, 46 to their respective fresh oil tanks 16, 18.

Preferably, the integral fresh fluid tanks 16, 18, 20 and 22 are formed by positioning one large tank above waste oil tank 12 and using partition walls 39, 41, and 43 to divide the large tank into smaller tanks, Alternatively, several individual tanks might be fused or welded together. Each of the fresh fluid tanks 16–24 and waste oil tank 12 have internal baffles 45 and 47, respectively, which run front to back and side to side to form grids in the tanks to reduce the amount of fluid shift that occurs inside the tanks when the service vehicle is in motion. The combination of baffles 45, 47 and the equal side-to-side distribution of fluid weight in the van bed 14 further enhances the stability of the service van 5.

The waste oil tank 12 of module 10 preferably has a capacity which will allow the van to service a sufficient number of vehicles to drain tanks 16, 18 of fresh oil without requiring drainage of the waste oil from tank 12. That is, the waste oil tank 12 has a capacity greater than the combined capacity of the main fresh oil tanks 16, 18. For example, the waste oil tank 12 in one embodiment of the present invention is dimensioned to contain 147 gallons while the fresh oil tanks 16, 18, both contain 67 gallons to combine for a total capacity of 134 gallons. In this way, starting with an empty waste oil tank 12, a service vehicle operator may service the maximum number of customer vehicles, completely draining the fresh oil tanks 16, 18 and pouring the waste oil drained from the vehicle engines into the waste oil tank 12, without having to return to a dump site to empty waste oil tank 12. Tank 12 includes a drain valve or spigot 48 at the rearward end 13 of the module 10 which is used to empty the tank 12 when it has become filled with waste oil. Since the waste oil tank 12 is completely sealed and only contains openings which communicate with the funnel 15 and the drain valve 48, sloshing waste oil cannot escape inside the service vehicle when the vehicle is in motion.

Figure 4:
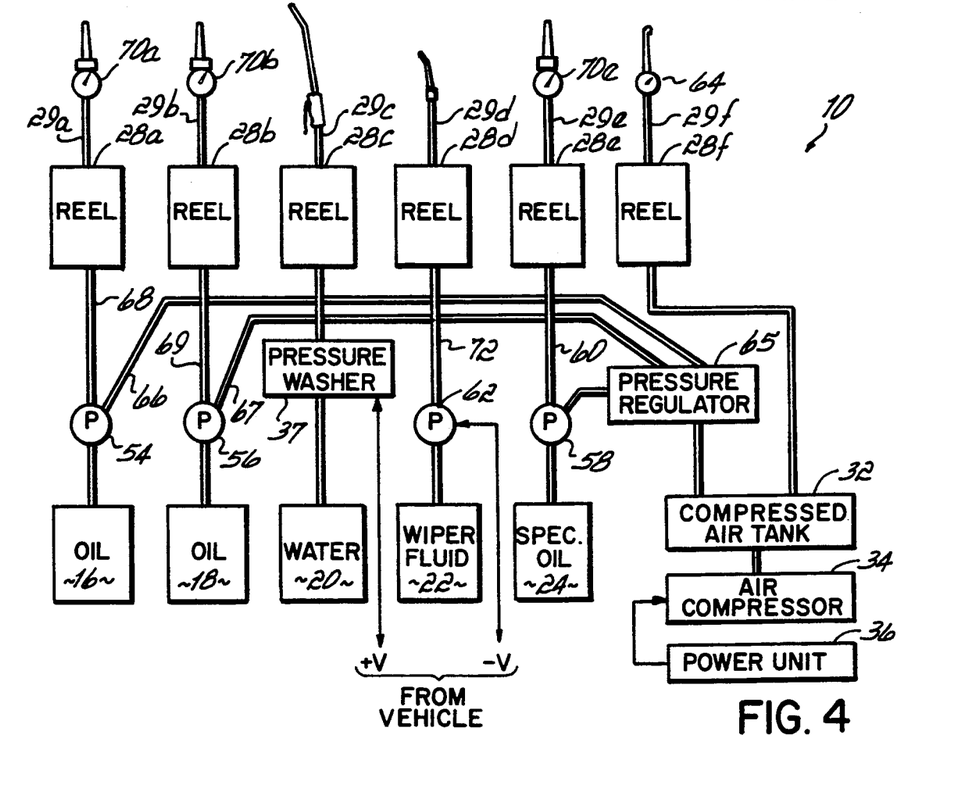
FIG. 4 is a diagrammatic view of the fluid and air transfer system of the module of FIG. 1.

Turning now to FIG. 4, the fluid from the fresh fluid tanks including the fresh oil tanks 16, 18, water tank 20, washer fluid tank 22, and the special fluid or special oil tank 24 must be quickly and easily transferred from the module 10 to a customer vehicle in order to efficiently service the customer vehicle. The fresh oil from tanks 16, 18 is removed using hydraulic pumps 54 and 56. In a preferred embodiment of the present invention, the pumps are pneumatic pumps such as Fire-Ball Lubrication Pumps available from Graco, Inc. of Minneapolis, Minn. Pumps 54, 56, and 58 are pneumatically connected to the compressed air storage tank 32 through a pressure regulator 65 which reduces the pressure from tank 32 to supply a usable air pressure for pumps 54, 56, and 58. Air supply lines 66, 67 connect pumps 54, 56, respectively, to regulator 65. Oil supply lines 68, 69 connect the pumps 54, 56 to their respective hoses 29a, 29b. When the service operator desires to refill the engine with fresh oil, he simply pulls the respective extensible hose, such as hose 29a, from the rear 13 of the module 10 and the service vehicle and extends hose 29a to the customer vehicle to pump oil into the engine. Specialty oil tank 24 is connected with hose 29e, through a pneumatic pump 62 similar to pumps 54, 56, and through line 60. Each oil hose 29a, 29b and 29e has a metering or indicating mechanism 70a, 70b and 70e at the outlet of the hose. The meter, such as meter 70a, indicates to the operator that the desired quantity of oil, e.g., 4 quarts, has been delivered to the vehicle.

Tank 22 for containing windshield washer fluid is connected to its respective reel 28d and hose 29d through an electric pump 62, such as Model No. 2100-12 available from Projet, Inc. (listed in the catalogs of W. W. Grainger, Inc. of Charlotte, N.C.), and through supply line 72. Electric pump 62 is powered directly from the service vehicle battery.

Compressed air is available from hose 29f which is directly connected to compressed air tank 32. The compressed air from hose 29f may be used to inflate the tires of the customer vehicle, and accordingly, hose 29f contains a pressure gauge 64 at its outlet end.

Figure 3:
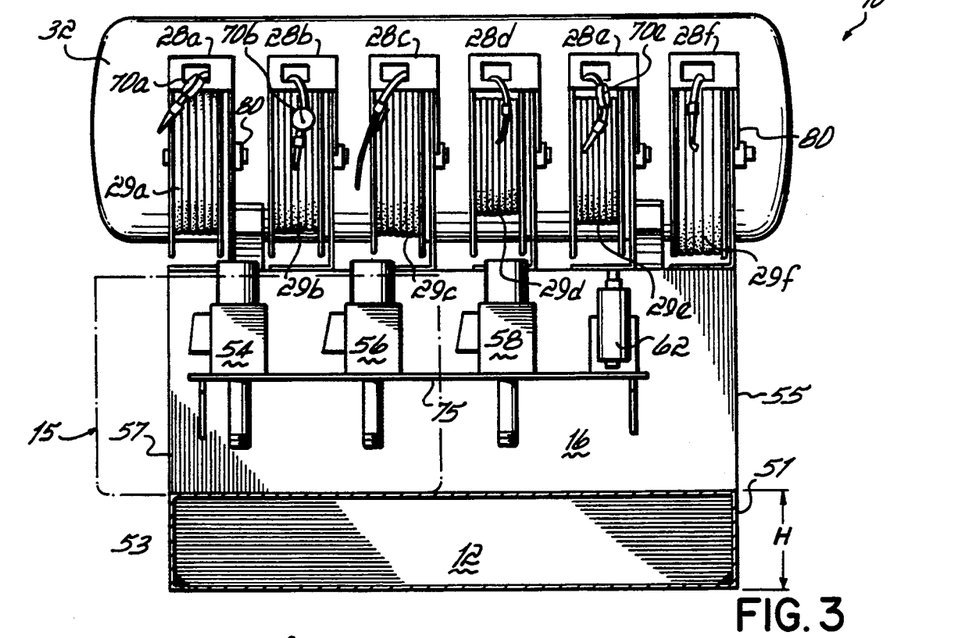
FIG. 3 is a rear elevational view along lines 3—3 of FIG. 1.

As may be seen in FIG. 1, the pumps 54, 56, 58, and 62 are mounted between the fresh oil tank 16 and funnel 15. The pumps are mounted on a mounting platform 75 such that they are substantially co-planar in a vertical plane located toward the rear end 13 of the module 10 (FIG. 3). The pumps are easily accessible by simply detaching funnel 15 from waste oil tank 12, and removing the funnel 15. They may thus be repaired or replaced as necessary without substantial disassembly of the module 10.

Waste oil tank 12 includes a fluid level sight gauge 76, mounted at the rearward end of the tank 12, to indicate when the tank 12 is filled with waste oil so that it may be drained. Similarly, each of the fresh fluid tanks may also include sight gauges, such as sight gauge 78 on specialty oil tank 24, to indicate the fluid levels in those tanks. In this way, the vehicle service operator may more accurately monitor the level of fluids in the tanks, so that he can estimate the number of customer vehicles he can service in the field before refilling his different fresh fluid supplies.

As stated above, module 10 includes a pressure washer unit 37. The washer unit 37 may be mounted in the passenger compartment (not shown) of the service vehicle, or may be mounted directly to module 10. It might also be mounted elsewhere as is necessary for spatial considerations, such as in the vehicle bed. Pressure washer 37, such as the JW 1000 available from Jenny Cleaning Equip. Coraopolis, PN, receives water from tank 20 and delivers it through hose 29c of reel 28c. Pressurized water may be utilized to clean-up spills or other mishaps which occur during servicing of the customer vehicle, as well as to clean any oil smudges or smears on the surface of the customer vehicle.

In the top view of the oil transfer module 10, as best shown in FIG. 2, it may be seen that the compressed air tank 32 is mounted to the rear of the hose reels 28. Behind the compressed air tank 32 and mounted to overlie tanks 20 and 22 is an air compressor unit 34 which supplies compressed air to tank 32. The air compressor is a commercially purchased unit such as Model No. ATABP1 available from American IMC, Charlotte, N.C. To electrically power compressor 34, a control power unit 36 is mounted to one side of compressor 34 substantially on top of tank 22. Control power unit 36, such as Road Power Unit available from Power Technology, Inc., Richardson, Tex., is coupled to the service vehicle engine to receive input power from the engine. Control power unit 36, in turn, provides a power form, such as AC power, which may be utilized by compressor 34.

The oil changing module 10 of the present invention is preferably dimensioned so that it extends from the rearward end of the service vehicle to a point approximately half-way along the length of the vehicle bed 14. A preferred embodiment of the module has a length of approximately 76 inches and a width dimension of approximately 51 inches. When the module 10 is mounted in the service vehicle, an ample amount of room is left between the module and the passenger compartment of the vehicle for use in storing and carrying other supplies and tools in order to offer a more complete service to the customer.

Therefore, the service module 10 of the present invention is adapted to be mounted in a service van to be conveniently transported to the location of a customer vehicle to perform various vehicle services such as changing the oil of the customer vehicle. The module 10 places the necessary supplies readily at the hands of the service operator for easy transfer from the modules to the customer vehicle to therefore, increase the overall efficiency of the van operator. This amounts to an increase in profits per service vehicle because of the increased number of customers that may be served in a days time. The module distributes the weight of the various fluids substantially equally on both sides of the vehicle to reduce any substantial shift in the weight of the module from side to side as the fresh fluid tanks are drained and the waste oil tank is filled in the course of the day, and internal tank baffles further stabilize the module during motion. For example, approximately 1050 pounds of fresh oil, 250 pounds of water, and 417 pounds of windshield washer fluid may be carried by the module 10 of the present invention without a risk of having the van containing the module roll over or tip while in motion. Easy access to each fresh fluid tank is obtained through a series of hoses in the rearward end of the module, and the waste oil funnel, also located at the rearward end, is used to contain and gravity feed waste oil into the waste oil tank. The large waste oil tank allows a greater number of vehicles to be serviced without the necessity of constantly and frequently draining the waste oil. Furthermore, specialty oil or specialty fluid may be carried in a detachable tank which removably attaches to the permanent fresh fluid tanks of the module. The module is dimensioned so as to allow adequate space in the van for storage of other necessary supplies and tools.

While the features of the service module of the present invention have been described in accordance with a preferred embodiment of the invention, it is to be understood that the invention is not limited thereby in light of the present disclosure. Various other alternative embodiments will be apparent to one of ordinary skill in the art without departing from the scope of the invention. For example, the fresh fluid tanks may contain different fluids in a different sequence than disclosed. Further, the module may include more than one detachable tank for specialty fluids or oils. Still further, the location of the module in the van might be shifted to allow access to the hoses and funnel at the side door of the van. Still other modification might be made by those of ordinary skill in the art without departing from the scope of the present invention.

I claim:

1. A method of changing the engine oil in a customer vehicle using a service vehicle having a front end, a rear end and a bed, the method comprising:
   a) driving the service vehicle to the location of the customer vehicle;
   b) draining the waste oil from the customer vehicle engine;
   c) pouring the waste oil into a waste oil tank, the waste oil tank forming a base of a service module located inside the service vehicle and mounted on the vehicle bed, the tank base spreading the weight of the module over the bed and positioning an equal portion of the volume of the waste oil on either side of a longitudinal axis of the service vehicle bed;
   d) extending a first extensible hose from the service vehicle to the customer vehicle, the hose connected to a fresh oil tank located above of the waste oil tank base in the module, the fresh oil tank locating an equal portion of its volume on either side of said longitudinal axis, the module distributing the weight of any respective oil contained in the tanks generally equally on either side of the service vehicle; and
   e) transferring fresh oil into the engine of the customer vehicle through the hose.

2. The method of claim 1 further comprising:
   a) extending a second extensible hose from the service vehicle to the customer vehicle, the hose connected to a second tank located above the waste oil tank base, the second tank locating an equal portion of its volume on either side of said longitudinal axis; and
   b) transferring the contents from the second tank to the customer vehicle engine through the second hose.

3. The method of claim 2 wherein the second tank contains windshield washer fluid and the fluid is transferred into a windshield washer fluid container in the customer vehicle.

4. The method of claim 2 wherein the second tank contains water, and the second hose is used to spray water for clean-up purposes.

5. The method of claim 2 wherein the second tank contains compressed air and the air is transferred to tires of the customer vehicle.

6. The method of claim 2 wherein the second tank contains a specialty oil and is detachably connected with the fresh oil tank to be quickly mounted and dismounted inside the service vehicle, the method further comprising:
   a) mounting the detachable specialty oil tank to the service vehicle before driving the service vehicle to the location of the, customer vehicle; and
   b) transferring the specialty oil from the detachable tank to the engine of the customer vehicle.

7. A service module for changing used engine oil in a customer vehicle, the module having a front end and a rear end and adapted to be mounted in the bed of a service vehicle, the module comprising:
   a waste oil tank for receiving and storing waste oil;
   at least one fresh fluid tank for holding fresh fluid to be dispensed;
   a fluid transfer system in communication with the fresh fluid tank to transfer fresh fluid from the fresh fluid tank to a location external of the fresh fluid tank;
   the waste oil tank being positioned below the fresh fluid tank and forming a base for the module to support the weight of the fresh fluid tank and the weight of the module, the waste oil tank configured to spread the weight of the module over the vehicle bed;
   the waste oil tank and fresh fluid tank further being positioned in the module to place a generally equal portion of the cumulative volume of the tanks on either side of a longitudinal axis of the service vehicle so that the weight of any fresh fluid and waste oil contained in the tanks is distributed generally equally on either side of the service vehicle.

8. The module of claim 7 wherein the fresh fluid tank is adapted to contain fresh oil and the fluid transfer system includes an extensible hose and a pump connected between the hose and the fresh fluid tank to pump fresh oil from the module into the engine of the customer vehicle to replace the waste oil drained from the customer vehicle engine.

9. The module of claim 8 where the extensible hose is wound on a spring biased reel so that it returns to a wound state upon completion of the fresh oil transfer, the reel being located proximate the rear end of the module to be accessible at the rear of the service vehicle when the module is mounted in the bed of said vehicle.

10. The module of claim 7 further comprising a funnel connected to the waste oil tank to receive waste oil and deliver it to the waste oil tank, the funnel located proximate the rear end of the module to be accessible at the rear of the service vehicle when the module is mounted in the bed of said vehicle.

11. The module of claim 7 wherein the waste oil tank includes a drain opening to drain waste fluid from the waste oil tank, the drain opening located proximate the rear end of the module to be accessible at the rear of the service vehicle when the module is mounted in the bed of said vehicle.

12. The module of claim 1 further comprising a plurality of fresh fluid tanks, each of said fresh fluid tanks being positioned above the waste oil tank to provide a large fresh fluid capacity in a compact module, the waste oil tank spreading the weight of the fresh fluid tanks over the bed of the vehicle.

13. The module of claim 12 wherein at least one of the fresh fluid tanks is removably attached to another of the fresh fluid tanks for quick mounting and dismounting from the module.

14. The module of claim 12, wherein each tank is connected to an extensible hose to dispense the contents of said tank, the hoses mounted proximate the rear end of the module on side-by-side reels rotating on a coaxial axis such that when the module is mounted in a service vehicle bed, all of the hoses are accessible to an operator from the rear of the service vehicle.

15. The module of claim 7 further comprising:
a compressor to supply compressed air;
a storage tank connected to the compressor to store the compressed air from said compressor; and
an extensible hose connected to the storage tank to deliver compressed air from the tank to a customer vehicle.

16. The module of claim 7 further comprising:
a water storage tank for holding water;
a pressurizing unit connected to the water tank for delivering pressurized water from said tank; and
an extensible hose connected to the pressurizing unit to convey the pressurized water from said water storage tank.

17. The module of claim 7 further comprising a fluid level gauge operatively connected to at least one of the tanks to visually indicate the level of fluid in the tank.

18. The module of claim 7 further comprising at least one additional fresh fluid tank and both said fresh fluid tanks adapted to contain fresh engine oil, the capacity of the waste oil tank being greater than the combined capacity of the two fresh fluid tanks so that all of the fresh oil from the two tanks may be transferred to customers' vehicles to replace the waste oil drained from the customers' vehicles without the resulting waste oil over filling the waste oil tank.

19. The module of claim 1 wherein the waste oil tank is dimensioned to have a lower height and a greater horizontal cross-sectional area than said fresh fluid tank to more efficiently spread the weight of the module over the bed of the service vehicle and partially away from a rear axle of the service vehicle.

20. The module of claim 19 wherein the waste oil tank is generally rectangular and has a width dimension between approximately 65% to 75% of its length dimension and a height dimension between approximately 8% to 15% of its length dimension.

21. The module of claim 7 wherein at least one of the tanks includes internal fluid baffles to prevent the fluid in the tank from shifting around substantially inside the tank when the vehicle is in motion.

22. The service module of claim 7, the waste oil tank having a generally flat bottom surface, the flat bottom surface being in intimate contact with a portion of the vehicle bed to more efficiently spread the weight of the module over the bed.

23. A service module for changing used engine oil in a customer vehicle, the module having a front end and a rear end and adapted to be mounted in the bed of a service vehicle having a front end and a rear end, the module comprising:
a waste oil tank for receiving and storing waste oil;
at least one fresh oil tank to hold fresh oil;
a water storage tank to hold water;
a washer fluid tank to hold windshield washer fluid;
an additional fresh fluid tank to hold an additional fresh fluid, the additional tank removably mounted to one of the fresh oil tank, water storage tank and washer fluid tank;
each of said fresh oil tank, water storage tank, washer fluid tank, and additional fresh fluid tank located on top of said waste oil tank;
all of the tanks being positioned in the module to place a generally equal portion of the cumulative volume of the tanks on either side of a longitudinal axis of the service vehicle so that the weight of any fluid contained in the tanks is distributed generally equally on either side of the service vehicle.

24. The module of claim 23 further comprising an extensible hose connected to each of the fresh oil tank, water storage tank, washer fluid tank, and additional fresh fluid tank to dispense the respective fluid from each tank.

25. The module of claim 24 further comprising a funnel connected to the waste oil tank to receive waste oil and deliver it to the waste oil tank, the funnel mounted below the end of the extensible hose connected to the fresh oil tank to capture any oil dripping from the end of the hose.

26. The module of claim 23 further comprising at least one additional fresh oil tank, the capacity of the waste oil tank the capacity of the waste oil tank being greater than the combined capacity of the two fresh oil tanks so that all of the fresh oil from the two tanks may be transferred to customers' vehicles to replace the waste oil drained from the customers' vehicles without the resulting waste oil over filling the waste oil tank.

27. The module of claim 23 wherein the waste oil tank is dimensioned to have a longer length and a lower height than any one of the other tanks to spread the weight of the tanks and any fluids contained in the tanks over the bed of the service vehicle and partially away from a rear axle of the service vehicle.

28. An improved service vehicle for changing used engine oil in a customer vehicle, the vehicle having a front end, a rear end, a frame, wheels, an engine and a vehicle bed, and further having a service module mounted in the bed comprising:
a waste oil tank for receiving and storing waste oil;
at least one fresh fluid tank for holding fresh fluid to be disposed;
a fluid transfer system in communication with the fresh fluid tank to transfer fresh fluid from the fresh fluid tank to a location external of the fresh fluid tank;
one of said tanks being a base tank positioned below the other tank and forming a base for the module to support the weight of the other tank and the weight of the module, the base tank configured to spread the weight of the module over the bed;
the waste oil tank and fresh fluid tank further being positioned in the module to place a generally equal portion of the cumulative volume of the tanks on either side of a longitudinal axis of the service vehicle so that the weight of any fresh fluid the waste oil contained in the tank is distributed generally equally on either side of the service vehicle.

29. The vehicle of claim 28 wherein the waste oil tank is the base tank and supports the weight of the fresh fluid tank.

30. The vehicle of claim 28, the module further comprising a funnel connected to the waste oil tank at one end of the waste oil tank to receive waste oil and deliver it to the waste oil tank, the module mounted in the bed such that the funnel is proximate the rear end of the vehicle to be accessible to a service operator at the rear of the vehicle.

31. The vehicle of claim 28 wherein the fresh fluid tank is connected to an extensible hose to dispense fluid from the fresh fluid tank, the hose being mounted on a reel proximate the rear end of the vehicle to be accessible to a service operator at the rear of the vehicle.

32. The vehicle of claim 28, the module further comprising a plurality of fresh fluid tanks, each of said fresh fluid tanks positioned above the base tank, the base tank spreading the weight of the fresh fluid tanks over the vehicle bed.

33. The vehicle of claim 32 wherein at least one of the fresh fluid tanks is removably attached to another of the fresh fluid tanks.

34. The vehicle of claim 28, wherein at least one of the tanks includes internal baffles to prevent the fluid in the tank from shifting around substantially inside the tank when the vehicle is in motion.

35. The vehicle of claim 28 wherein the base tank is dimensioned to have a lower height and a greater horizontal cross-sectional area than the other tank to more efficiently spread the weight of the module over the bed of the service vehicle.

36. The vehicle of claim 28, the base tank having a generally flat bottom surface, the flat bottom surface being in intimate contact with a portion of the vehicle bed to more efficiently spread the weight of the module over the bed.

* * * * *